(12) United States Patent
Kuwano

(10) Patent No.: US 7,891,707 B2
(45) Date of Patent: Feb. 22, 2011

(54) STEERING HANGER BEAM

(75) Inventor: Yohei Kuwano, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 225 days.

(21) Appl. No.: 12/286,782

(22) Filed: Oct. 2, 2008

(65) Prior Publication Data

US 2009/0090211 A1    Apr. 9, 2009

(30) Foreign Application Priority Data

| Oct. 4, 2007 | (JP) | ............................. 2007-261171 |
| Oct. 5, 2007 | (JP) | ............................. 2007-262354 |
| Oct. 10, 2007 | (JP) | ............................. 2007-264463 |

(51) Int. Cl.
*B62D 21/03* (2006.01)
(52) U.S. Cl. ................... 280/779; 280/795; 296/193.02
(58) Field of Classification Search ................. 280/779, 280/795; 180/90; 296/193.02, 193.07, 193.09, 296/70, 72, 204
See application file for complete search history.

(56) References Cited

U.S. PATENT DOCUMENTS

| 5,311,960 | A | * | 5/1994 | Kukainis et al. ............... 180/90 |
| 5,564,769 | A | * | 10/1996 | Deneau et al. ................ 296/72 |
| 6,203,092 | B1 | | 3/2001 | Yoshinaka |
| 7,374,232 | B2 | * | 5/2008 | Ellison et al. .......... 296/193.02 |
| 7,516,986 | B2 | * | 4/2009 | Kokubo ....................... 280/779 |
| 2006/0017309 | A1 | | 1/2006 | Wolf |
| 2006/0186650 | A1 | * | 8/2006 | Kuwano et al. ............. 280/732 |
| 2010/0090451 | A1 | * | 4/2010 | Atsumi et al. ............... 280/779 |
| 2010/0101090 | A1 | * | 4/2010 | Nakano et al. ............. 29/897.2 |

FOREIGN PATENT DOCUMENTS

| DE | 101 52 242 A1 | 9/2003 |
| DE | 10 2004 025 245 A1 | 12/2005 |
| EP | 1 762 468 A2 | 3/2007 |
| FR | 2 791 313 A1 | 9/2000 |
| JP | 05-139237 | 6/1993 |
| JP | 05-170010 | 7/1993 |
| JP | 11-165563 A | 6/1999 |
| JP | 11-345818 | 12/1999 |
| JP | 2001-018841 | 1/2001 |
| JP | 2002-053071 A | 2/2002 |
| JP | 2003-237633 | 8/2003 |
| JP | 2004-338479 | 12/2004 |
| JP | 2005-289239 | 10/2005 |
| JP | 2005-335528 | 12/2005 |

(Continued)

*Primary Examiner*—Paul N Dickson
*Assistant Examiner*—Drew Brown
(74) *Attorney, Agent, or Firm*—Carrier Blackman & Associates, P.C.; William D. Blackman; Joseph P. Carrier

(57) ABSTRACT

The steering hanger beam extending in a width direction of a vehicle and connected to left and right vehicle-body members, is provided with: a main member which supports a steering device; a pair of front and rear transverse beam portions connected to the main member in the width direction of the vehicle so as to be offset from an axis of the main member to front and rear; and an opening which is formed between the pair of front and rear transverse beam portions so as to penetrate in substantially a vertical direction.

15 Claims, 13 Drawing Sheets

| | FOREIGN PATENT DOCUMENTS | |
|---|---|---|
| JP | 2006-001333 | 1/2006 |
| JP | 2006-504571 A | 2/2006 |
| JP | 2006-188126 | 7/2006 |
| JP | 2007-230449 A | 9/2007 |
| WO | 2004/041565 A1 | 5/2004 |

* cited by examiner

STEERING HANGER BEAM

Priority is claimed on Japanese Patent Application No. 2007-261171, filed on Oct. 4, 2007, Japanese Patent Application No. 2007-262354, filed on Oct. 5, 2007, and Japanese Patent Application No. 2007-264463, filed on Oct. 10, 2007, the contents of which are incorporated herein by reference.

BACKGROUND OF THE INVENTION

1. Field of the Invention

The present invention relates to a steering hanger beam.

2. Description of the Related Art

Conventionally, a vehicle-body structure having a light-alloy steering support member is known. In such a structure, an airbag is mounted to the upper portion of the steering support member (for example, see Japanese Unexamined Patent Publication, First Publication No. 2005-289239).

In the above-described related art, since the airbag is mounted to the upper portion of the steering support member on the basis of the steering support member, the height of an upper surface of an instrument panel increases. For this reason, for example, a passenger feels pressure, and an inclination angle of a front window glass is limited, thereby deteriorating a degree of freedom of design of the vehicle body.

Therefore, a first object of the invention is to provide a steering hanger beam capable of improving the degree of freedom of design of a vehicle body and of facilitating an arrangement of peripheral components.

Additionally, in the past, a reinforcing member which is a structure member formed by die-casting is provided in the instrument panel of the vehicle. In order to mount equipment, such as electric components to the reinforcing member, there is provided a storage portion surrounded by wall portions (for example, see Japanese Unexamined Patent Publication, First Publication No. 2005-335528).

However, in the above-described reinforcing member, it is necessary to provide a plurality of wall portions in order to form the storage portion. Therefore, the reinforcing member needs to be simplified by die-casting, but becomes complicated. Additionally, in a case where a plurality of storage portions surrounded by the wall portions is provided, there is a problem in that casting defects easily occur.

Therefore, a second object of the invention is to provide a steering hanger beam (reinforcing member) capable of facilitating an arrangement of equipment, such as electric components with a simple structure and of preventing an occurrence of casting defects, even in a case where the steering hanger beam is formed by die-casting.

Furthermore, when the electric component is mounted to the storage portion, a minus terminal of a harness of the electric component needs to be grounded. Incidentally, when such a ground is carried out, since a casting surface of the reinforcing member formed by die-casting is rough, there is problem that the ground performance is lower than a case in which an ground is carried out in a flat surface of a general metal panel.

Therefore, a third object of the invention is to provide a steering hanger beam (reinforcing member) capable of improving the ground performance of electric components, even in a case where the steering hanger is formed by die-casting.

SUMMARY OF THE INVENTION

In order to solve the above-described problems and achieve the objects, a steering hanger beam according to the present invention has features that a steering hanger beam extending in a width direction of a vehicle and connected to left and right vehicle-body members is provided with: a main member which supports a steering device; a pair of front and rear transverse beam portions connected to the main member in the width direction of the vehicle so as to be offset from an axis of the main member to front and rear; and an opening which is formed between the pair of front and rear transverse beam portions so as to penetrate in substantially a vertical direction.

In this case, it is possible to dispose a functional component within the opening formed between the pair of longitudinal front and rear transverse beam portions.

According to the above-described steering hanger bean, since it is possible to dispose the functional component within the opening formed between the pair of front and rear transverse beam portions, it is possible to decrease the height of the upper surface of the instrument panel covering the steering hanger beam than a case in which the functional component is disposed on the upper portion of the main member. Therefore, it is advantageous to give a sense of freedom to a passenger and to improve the degree of freedom of design of the vehicle body without limiting an inclination angle of a front window glass.

It may be arranged such that the main member is connected to the pair of front and rear transverse beam portions in a substantially Y-shape.

In this case, it is possible to withstand a shock load applied on the main member by distributing the shock load by the pair of front and rear transverse beam portions at the time of a side collision of the vehicle.

Therefore, it is advantageous to more decrease the thickness of the transverse beam portions than a case in which only one main member withstands the shock load and to improve the degree of freedom of design, including a layout of the peripheral components.

It may be arranged such that the steering hanger beam is further provided with a central transverse beam portion which is provided in the rear of the main member so as to be parallel to the axis of the main member, wherein the rear transverse beam portion of the pair of front and rear transverse beam portions is connected to the central transverse beam portion and the main member in a substantially Y-shape.

In this case, it is possible to ensure an arrangement space for the functional components in the vicinity of the center and to facilitate the layout by withstanding the shock load acting on the main member in a distributed manner at the time of the side collision of the vehicle.

According to the above-described steering hanger beam, it is possible to ensure the arrangement space for the functional components in the vicinity of the center and to facilitate the layout by withstanding the shock load acting on the main member in a distributed manner at the time of the side collision of the vehicle. For this reason, it is advantageous to improve the degree of freedom of design.

It may be arranged such that the steering hanger beam is further provided with a passenger-seat airbag device which is disposed in the opening, wherein an airbag support portion for supporting the passenger-seat airbag device is provided in the main member or the pair of front and rear transverse beam portions.

In this case, it is possible to support the passenger-seat airbag device within the opening formed by the pair of front and rear transverse beam portions at the time of the side collision of the vehicle.

According to the above-described steering hanger beam, it is possible to support the passenger-seat airbag device within the opening formed by the pair of front and rear transverse beam portions at the time of the side collision of the vehicle. Therefore, it is possible for the height of the upper surface of the instrument panel covering the steering hanger beam to be as low as possible, and to support the airbag device within the opening opened upward, thereby not disturbing the expanding of the airbag.

It may be arranged such that the passenger-seat airbag device is provided on the axis of the main member.

According to the above-described steering hanger beam, since the airbag device is disposed in the axis of the main member, it is possible to use the airbag device as a reinforcing member at the time of the side collision of the vehicle.

It may be arranged such that a steering support portion which extends from the main member to the rear side of the vehicle is further provided.

It may be arranged such that a central transverse beam portion which is provided in the rear of the main member so as to be parallel to the axis of the main member; and a connection arm portion which connects the central transverse beam portion- to the rear portion of the steering support portion are further provided.

It may be arranged such that a support arm portion which connects the main member to the connection arm portion is further provided.

It may be arranged such that the steering hanger beam is provided with: a central transverse beam portion which is provided in the rear of the main member so as to be parallel to the axis of the main member; and a support post which connects the central transverse beam portion to a floor panel of the vehicle.

It may be arranged such that a sectional shape of the main member is substantially a U-shape having an open portion therein, a protruding portion which is provided on a bottom wall of the main member opposite to the open portion so as to protrude toward the open portion; and a mounting hole for mounting equipment, which is provided on the protruding portion.

In this case, unlike the case in which the storage portion is formed by being surrounded by the wall portions, it is not necessary to reduce the area of the beam section. Therefore, it is possible for storage equipment to be within the steering hanger beam while maintaining the sectional shape.

According to the above-described steering hanger beam, unlike the case in which the storage portion is formed by being surrounded by the wall portions, it is not necessary to reduce the area of the beam section. Therefore, it is possible to accommodate the equipment within the steering hanger beam while keeping the sectional shape. Accordingly, it is advantageous to facilitate the arrangement of the equipment without deteriorating the strength and rigidity thereof.

It may be arranged such that a concave portion is provided in the inside of the protruding portion so as to be opened toward a direction opposite to a protruding direction of the protruding portion.

In this case, it is possible to set the thickness of the protruding portion to be the same as the thickness at of the peripheral portion. Therefore, it is possible to improve the strength of a portion having the concave portion by preventing an occurrence of casting defects such as a cavity.

According to the above-described steering hanger beam, it is possible to set the thickness of the protruding portion to be the same as the thickness of the peripheral portion. Therefore, it is possible to improve the buckling strength of a portion having the concave portion by preventing an occurrence of casting defects such as a cavity. Accordingly, it is advantageous to further realize a decrease in weight.

It may be arranged such that the steering hanger beam is further provided with: a mounting portion which is provided in the end in a width direction of the vehicle so as to be connected to the left and right vehicle-body members, wherein an equipment support portion is provided on the mounting portion for supporting equipment.

It may be arranged such that the main member, the pair of front and rear transverse beam portions, and the mounting portion are integrally formed of light-metal materials by die-casting.

It may be arranged such that a thick portion is provided on the mounting portion so as to be more swollen than a peripheral portion; and a cut surface being exposed by cutting a surface of the thick portion for connecting a ground terminal of a harness is formed on the thick portion.

In this case, it is possible to surely make the ground terminal be brought into contact with the cut surface in which the unprocessed surface of the die-cast is exposed. The ground installation portion is formed into the thick portion more swollen than the peripheral portion. Accordingly, even when the thick portion is scraped thereby form the cut surface, it is possible to ensure the thickness of the steering hanger beam.

According to the above-described steering hanger beam, it is surely possible to make the ground terminal to be brought into contact with the cut surface in which the unprocessed surface of the die-cast is exposed. Accordingly, it is more advantageous to ensure a ground area than a case in which the ground terminal is brought into contact with a casting surface and to improve the ground performance thereof.

Since the ground installation portion is formed into the thick portion more swollen than the peripheral portion, even when the thick portion is scraped thereby form the cut surface, it is possible to ensure the thickness of the steering hanger beam. Therefore, it is advantageous to ensure the strength and rigidity of the steering hanger beam.

DETAILED DESCRIPTION OF THE INVENTION

Hereinunder, an exemplary embodiment of the invention will be described with reference to the accompanying drawings.

Figure 1:
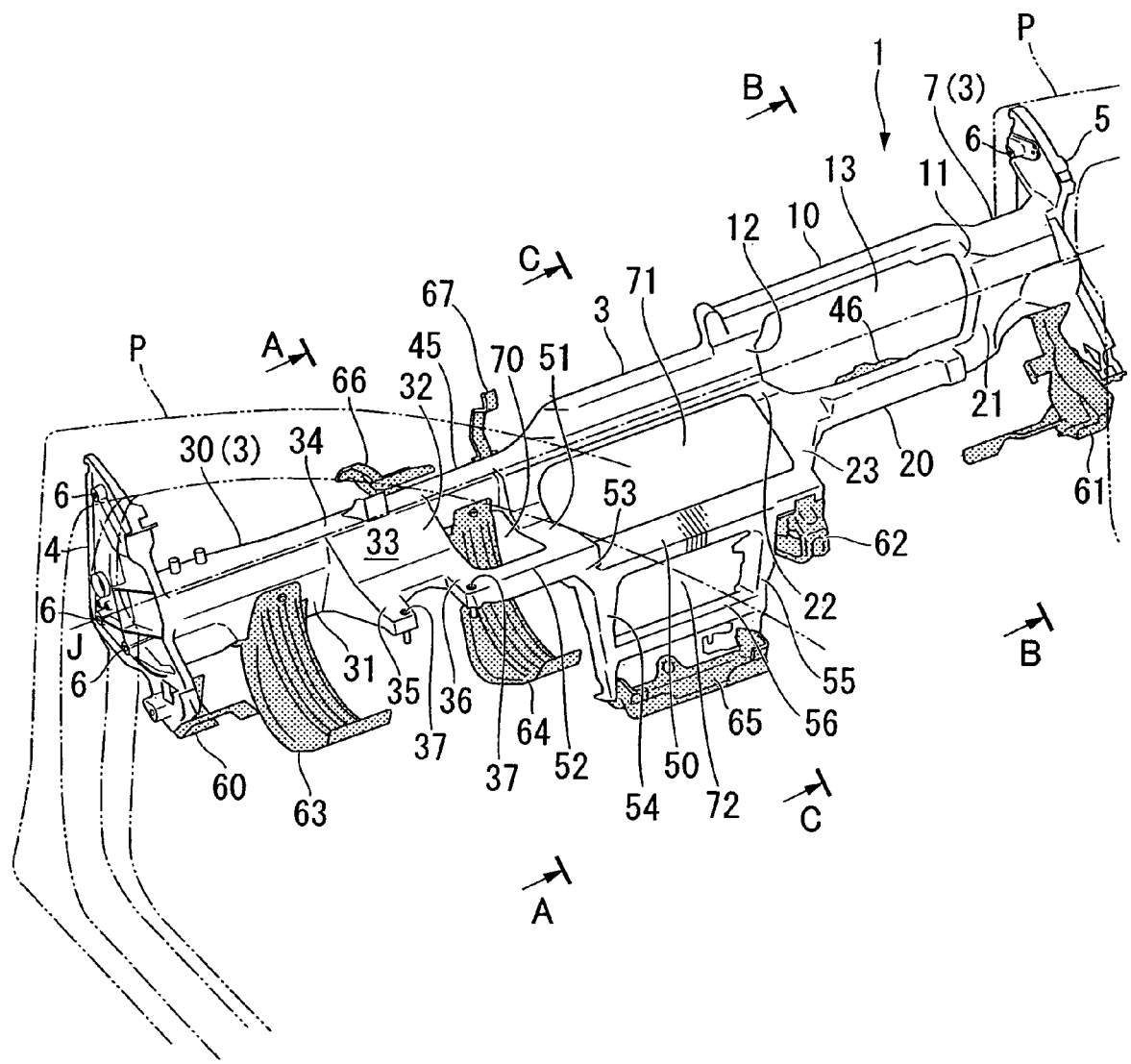
FIG. 1 is a perspective view showing a steering hanger beam according to an embodiment of the present invention.

FIG. 1 shows a steering hanger beam 1 according to the embodiment of the present invention, and the steering hanger beam 1 is used for a so-called left handle type in which a driver seat is disposed on the left side and a passenger seat is disposed on the right side as shown in FIG. 1. The steering hanger beam 1 is mainly formed of a magnesium alloy by die-casting and is covered by an instrument panel 2 described below.

The steering hanger beam 1 includes a main member 3 extending in a width direction of a vehicle so as to substantially extend in a horizontal direction. A left mounting portion 4 mounted to an inner wall of a left front pillar P is provided in an end portion of the main member 3 on the driver-seat side so as to be aligned in a width direction of a vehicle. A right mounting portion 5 mounted to an inner wall of a right front pillar P is provided in an end portion of the main member 3 on the passenger-seat side so as to be aligned in a width direction of a vehicle.

A vehicle-body mounting hole 6 is provided at one position of each upper end portion and at two positions of each lower end portion of the left and right mounting portions 4 and 5 so as to be fixed to the left and right front pillars P by bolts.

The main member 3 is substantially formed into a U-shape in a sectional view, and extends from the left mounting portion 4 toward the substantial center in a width direction of a vehicle so as to be connected to the right mounting portion 5 via a right end portion 7 with a pair of front and rear transverse beam portions 10 and 20 provided on the passenger-seat side interposed therebetween.

Figure 2:
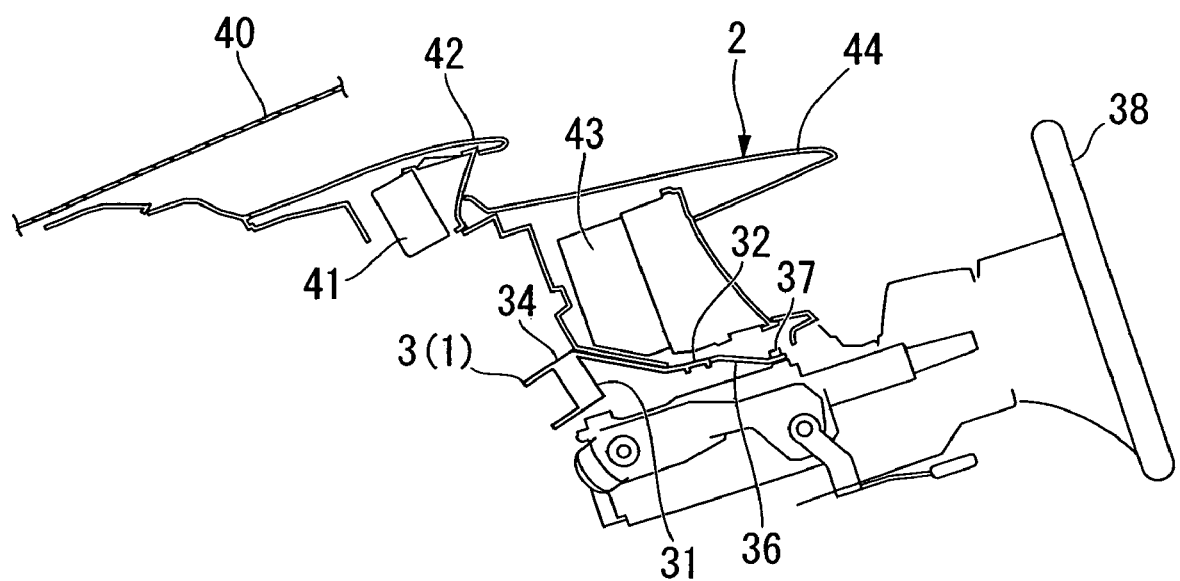
FIG. 2 is a sectional view along the line A-A in FIG. 1.

As shown in FIGS. 1 and 2, a steering support portion 32 having a U-shape in a top view is integrally formed with the center of a rear wall 31 of a left portion 30 of the main member 3 on the driver-seat side in a width direction of a vehicle so as to protrude backward. An upper surface 33 of the steering support member 32 is conformably formed with a surface 34 of the main member 3 so as to be inclined backward, and a bolt 37 is inserted into the front end portions of protruding left and right mounting portions 35 and 36, thereby fixing a steering device 38 by the bolts 37.

The instrument panel 2 is provided so as to cover the steering hanger beam 1. The instrument panel 2 is provided with a first hood part 42 having therein a first display portion 41 for displaying information high-frequently used during a driving operation, such as a speedometer and a second hood part 44 having therein a second display portion 43 for displaying information observed at a necessary time, such as a tachometer, which are provided from a position in the vicinity of the lower portion of a front window glass 40 in front of the steering device 38.

Figure 3:
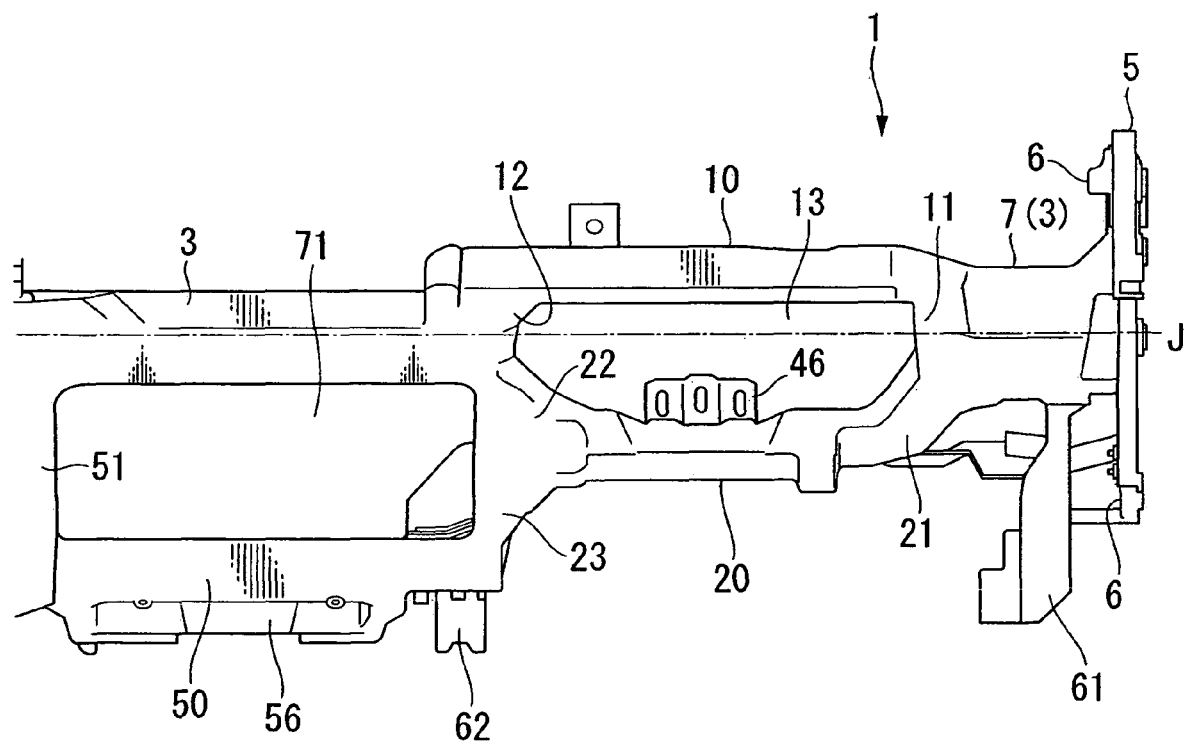
FIG. 3 is a top view showing a main part in the vicinity of a right end portion in FIG. 1.

As shown in FIG. 3, the right end portion 7 of the main member 3 is integrally formed with the right mounting portion 5, and is continuously formed with a pair of front and rear transverse beam portions 10 and 20 offset from each other with respect to a J axis in a longitudinal direction, that is, the front transverse beam portion 10 and the rear transverse beam portion 20 in a width direction of a vehicle. Specifically, the left end of the right end portion 7 of the main member 3 is continuously connected to the right end portions of the front and rear transverse beam portions 10 and 20 with a right-front slope portion 11 and a right-rear slope portion 21 interposed therebetween in a substantially Y-shape. Additionally, the right-front slope portion 11 and the right-rear slope portion 21 are inclined inward from the main member 3 in a longitudinal direction of a vehicle body.

The front and rear transverse beam portions 10 and 20 extend within a width of the passenger seat. As seen best in FIG. 4, each of the transverse beam portions 10, 20 is formed so as to have a substantially U-shaped cross-sectional shape, with an opening thereof facing substantially downwardly at an angle. The left end portion of the front transverse beam portion 10 is connected to the main member 3 with a center-front slope portion 12 interposed therebetween, and the left end portion of the rear transverse beam portion 20 is connected to the main member 3 with a center-rear slope portion 22 interposed therebetween. Accordingly, the left end portions of the front and rear transverse beam portions 10 and 20 are continuously connected to the main member 3 in a substantially Y-shape. Additionally, the center-front slope portion 12 and the center-rear slope portion 22 are inclined outward from the main member 3 in a longitudinal direction of a vehicle body.

Here, the left end portion of the rear transverse beam portion 20 is connected to a central transverse beam portion 50. The central transverse beam portion 50 is provided in the rear of the main member 3 and the rear transverse beam portion 20 so as to be parallel to the J axis of the main member 3. The right end portion of the central transverse beam portion 50 is connected to the left end portion of the rear transverse beam portion 20 with the rear slope portion 23 making a pair with the center-rear slope portion 22 interposed therebetween. Accordingly, the left end portion of the rear transverse beam portion 20 is continuously connected to the right end portions of the main member 3 and the central transverse beam portion 50 in a substantially Y-shape.

Accordingly, an airbag opening 13 is vertically formed at a portion between the front and rear transverse beam portions 10 and 20 surrounded by the right-front slope portion 11, the right-rear slope portion 21, the center-front slope portion 12, and the center-rear slope portion 22, and an airbag mounting bracket 46 is fixed to the front wall of the rear transverse beam portion 20.

Figure 4:
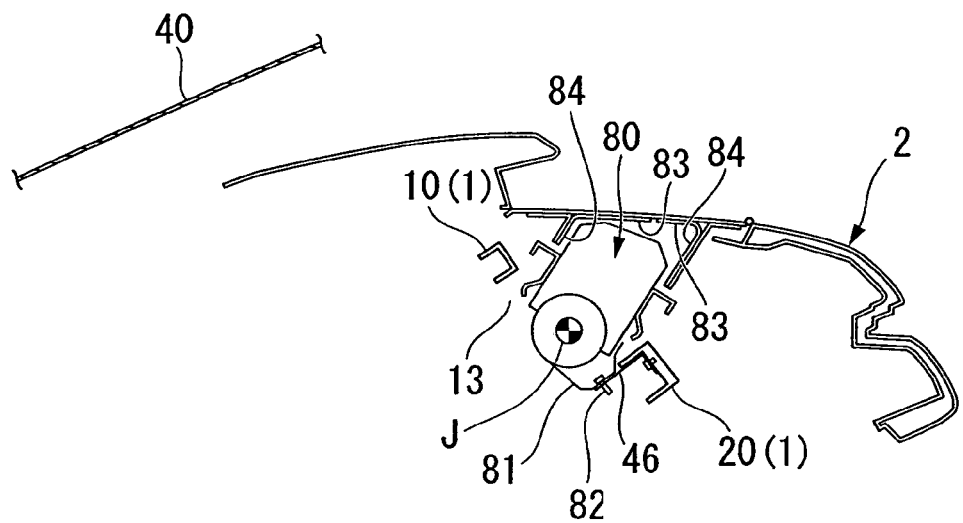
FIG. 4 is a sectional view along the line B-B in FIG. 1.

FIG. 4 is a sectional view taken along the line B-B in FIG. 1. In the drawing, the airbag mounting bracket 46 is provided with a passenger-seat airbag device 80. The lower portion of a casing 81 of the passenger-seat airbag device 80 is fixed to the airbag mounting bracket 46 extending downward by a bolt 82. The passenger-seat airbag device 80 is disposed on the J axis of the main member 3 so as to be disposed within the front and rear transverse beam portions 10 and 20 forming the airbag opening 13. Lids 83 and 83 are provided above the passenger-seat airbag device 80 so as to be openable at a position below the surface of the instrument panel 2. Upon operation of the passenger-seat airbag device 80, the lids 83 and 83 are opened, and the instrument panel 2 is broken, thereby expanding an airbag (not shown). Additionally, a guide member 84 is provided in the rear of the instrument panel 2 so as to ensure an expanding direction of the airbag.

In FIGS. 1 and 2, the central transverse beam portion 50 is disposed at the center in a width direction of a vehicle, and the left end portion thereof is connected to the front end portion of a support arm portion 51 extending backward from the rear wall 31 of the main member 3. A connection arm portion 52 is connected between the front end portion of the support arm portion 51 and the front end portion of the right mounting portion 36 of the steering support portion 32. A shift-lever opening 70 is formed at a portion surrounded by the steering support portion 32, the connection arm portion 52, the support arm portion 51, and the main member 3.

A connection portion 53 of the connection arm portion 52, the support arm portion 51, and the central transverse beam portion 50 is connected to the upper end portion of a left support post portion 54 of which the lower end portion is fixed to a floor panel (not shown) with a post bracket 65 described below interposed therebetween. The upper end portion of a right support post portion 55 making a pair with the left support post portion 54 is connected to the slightly inner portion of the right end portion of the central transverse beam portion 50. The lower end portion of the right support post portion 55 extends downward, and is connected to the floor panel (not shown) with the post bracket 65 interposed therebetween. A connection portion 56 is provided at the center in a vertical direction so as to be disposed between the right and left support post portions 55 and 54 and to connect them to each other in a horizontal direction. The right and left support post portions 55 and 54 are continuously formed with a center console (not shown) in design.

Accordingly, a duct-arrangement opening 71 for an air conditioning device is provided at a portion surrounded by the main member 3, the central transverse beam portion 50, the support arm portion 51, the center-rear slope portion 22, and the rear slope portion 23. A front-grill opening 72 is formed between the right and left support post portions 55 and 54 below the duct-arrangement opening 71.

Figure 5:
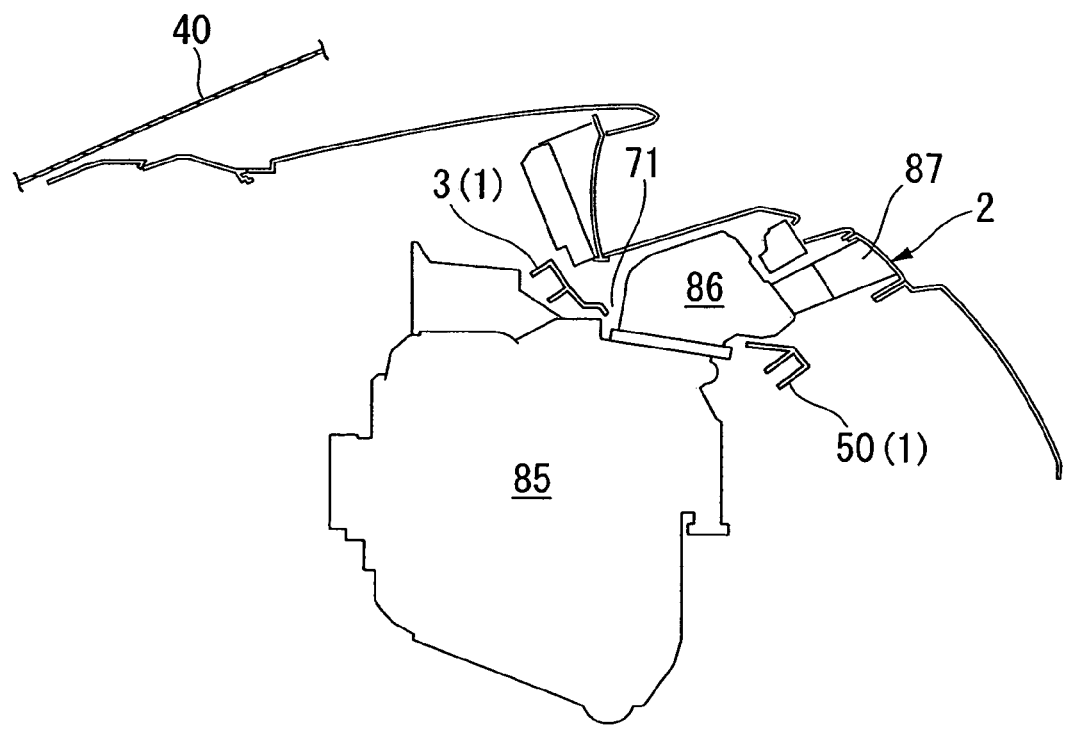
FIG. 5 is a sectional view along the line C-C in FIG. 1.

FIG. 5 is a sectional view taken along the line C-C in FIG. 1. In the same drawing, a duct 86 of a blower unit 85 is disposed at a position where the duct-arrangement opening 71 is formed by the main member 3 and the central transverse beam portion 50. The duct 86 is disposed in a width direction of a vehicle so as to supply air-conditioning wind to an air outlet 87 formed at the front surface of the instrument panel 2.

In FIG. 1, the lower end portion of the left mounting portion 4 of the main member 3 is mounted with an iron electric-component support bracket 60. The lower end portion of the right mounting portion 5 of the main member 3 is mounted with an iron bracket 61 supporting a glove box and serving as a passenger-seat right knee bolster for protecting a leg of a passenger sitting in the passenger seat. A rear wall of the right end portion of the central transverse beam portion 50 is mounted with an iron passenger-seat left knee bolster 62.

An iron driver-seat left knee bolster 63 and an iron driver-seat right knee bolster 64 are mounted to the rear wall 31 of the main member 3 with the support arm portion 51 of the main member 3 interposed therebetween so as to extend downward in an arc shape. The lower end portions of the right and left support post portion 55 and 54 are mounted with the iron post bracket 65 connecting them to each other, and the post bracket 65 is fixed to the floor panel of the vehicle.

In a front wall 45 of the main member 3, an iron dashboard bracket 66 is fixed to a forward position of the right mounting portion 36 of the steering support portion 32. The dashboard bracket 66 has a function of absorbing a shock load occurring at the time of the front collision and the side collision of the vehicle by a plastic deformation. Additionally, in the front wall 45 of the main member 3, an iron fixed bracket 67 for mounting the instrument panel is mounted to the right side of the dashboard bracket 66.

Thus, the airbag mounting bracket 46, the support bracket 60, the bracket 61, the passenger-seat left knee bolster 62, the driver-seat left knee bolster 63, the driver-seat right knee bolster 64, the post bracket 65, the dashboard bracket 66, and the fixed bracket 67 are formed by iron members and mounted, thereby simplifying the shape of the steering hanger beam 1. Additionally, in FIG. 1, the iron members are depicted by hatching.

According to the above-described embodiment, it is possible to mount the passenger-seat airbag device 80 to the inside of the airbag opening 13 formed between the pair of front and rear transverse beam portions 10 and 20. Therefore, it is possible for the height of the upper surface of the instrument panel 2 covering the steering hanger beam 1 to be lower than a case in which the passenger-seat airbag device 80 to be disposed at the upper portion of the main member 3. Accordingly, it is possible to give a sense of freedom to the passenger and to improve a design degree of the vehicle body without limiting the inclination angle of the front window glass 40.

It is possible to withstand a shock load acting on the main member 3 at the time of the side collision of the vehicle by distributing the shock load by the pair of front and rear transverse beam portions 10 and 20. Therefore, it is possible to decrease the thickness of the front and rear transverse beam portions 10 and 20 more than a case in which only one main member 3 withstands the shock load. Accordingly, it is possible to facilitate the arrangement of the peripheral members and to improve a design degree.

Here, the left end portion of the right end portion 7 of the main member 3 is continuously connected to the right end portions of the front and rear transverse beam portions 10 and 20 with the right-front slope portion 11 and the right-rear slope portion 21 interposed therebetween in a substantially Y-shape. The left end portions of the front and rear transverse beam portions 10 and 20 are continuously connected to the main member 3 with the center-front slope portion 12 and the center-rear slope portion 22 interposed therebetween in a substantially Y-shape. Accordingly, even when the shock load acts on the left mounting portion 4 or the right mounting portion 5 of the main member 3 at the time of the side collision in any direction, it is surely possible to withstand the shock load by smoothly distributing the shock load by the pair of front and rear transverse beam portions 10 and 20 in an inclined direction.

Particularly, for a load input from the right mounting portion 5, the left end portion of the rear transverse beam portion 20 is continuously connected to the right end portions of the main member 3 and the main transverse beam portion 50 in a substantially Y-shape. Therefore, since it is advantageous in that the load is distributed from the central transverse beam portion 50 to the floor panel with the left and right support post portions 54 and 55 interposed therebetween, it is possible to decrease the thickness of the main member 3 in the vicinity of the center. Accordingly, it is possible to ensure a space for arranging the blower unit 85 as much as the decreased thickness and to facilitate a layout, thereby increasing a design degree.

It is possible to support the passenger-seat airbag device 80 disposed on the J axis within the airbag opening 13 formed by the pair of front and rear transverse beam portions 10 and 20 at the time of the side collision of the vehicle. Therefore, since it is possible for the height of the upper surface of the instrument panel 2 covering the steering hanger beam 1 to be as low as possible, and to support the passenger-seat airbag device 80 within the airbag opening 13 opened upward, the airbag is capable of expanding without any disturbance. Since the passenger-seat airbag device 80 is disposed on the J axis of the main member 3, it is possible to use the passenger-seat airbag device 80 as a reinforcing member at the time of the side collision of the vehicle. In this case, the airbag mounting bracket 46 for supporting the passenger-seat airbag device 80 is fixed to the front wall of the rear transverse beam portion 20. Therefore, since the airbag mounting bracket 46 itself supports the peripheral edge of the airbag opening 13 formed between the front and rear transverse beam portions 10 and 20, it is possible to improve the mounting reliability.

Additionally, the invention is not limited to the above-described embodiment, but for example, other functional components may be disposed between the front and rear transverse beam portions 10 and 20 instead of the passenger-seat airbag device 80.

A case in which the airbag mounting bracket 46 is provided in the front wall of the rear transverse beam portion 20 has been described, but the airbag mounting bracket 46 may be mounted to the rear wall (the right end of the main member 3 or the left of the right end portion 7) of the front transverse beam portion 10 within the inside of the airbag opening 13.

Next, as shown in FIGS. 6 to 9, a fuse box 180 as equipment may be mounted to a position in the vicinity of the left mounting portion 4.

Figure 6:
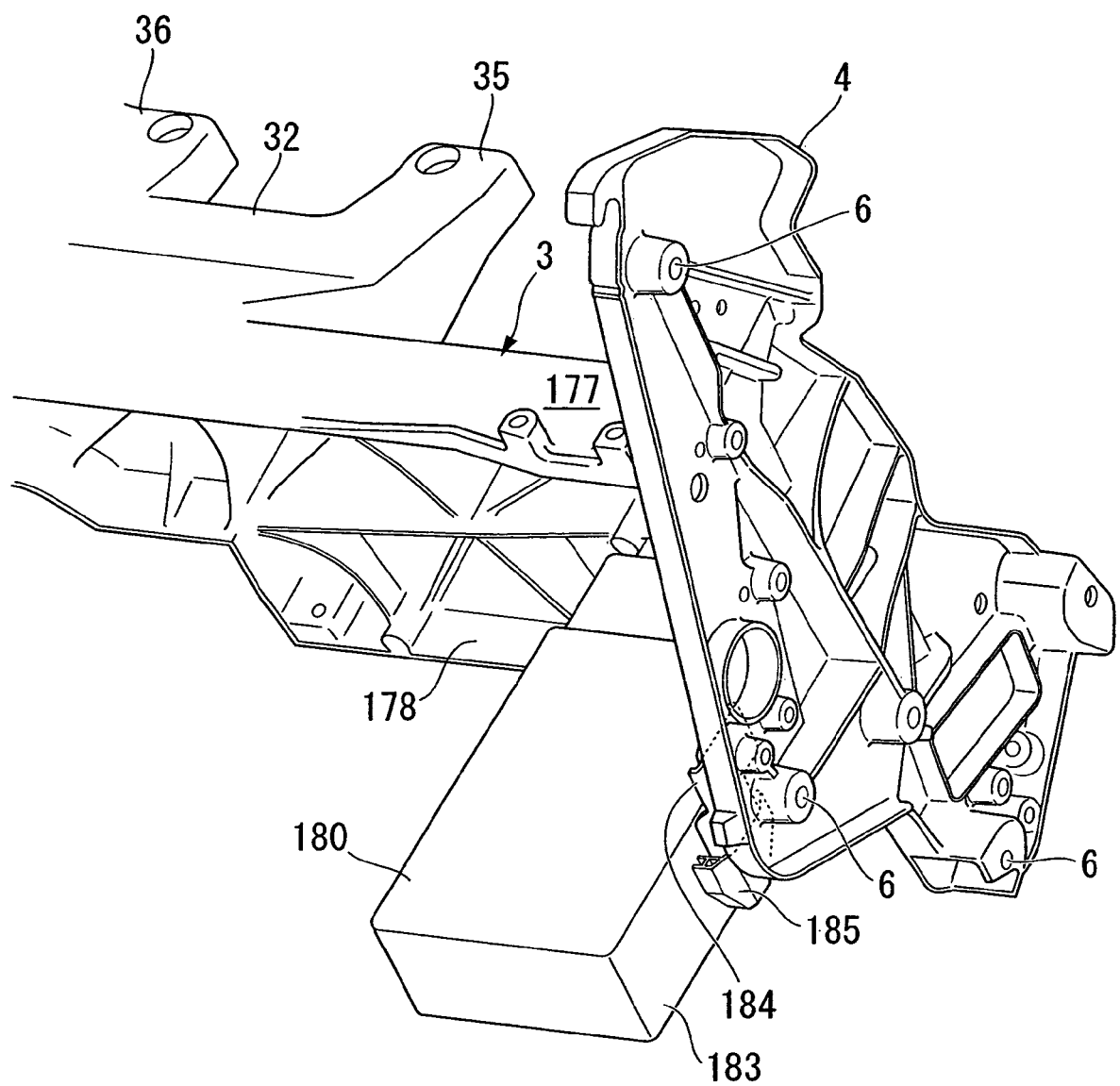
FIG. 6 is an enlarged perspective view from the obliquely front side showing a left mounting portion in FIG. 1.
Figure 7:
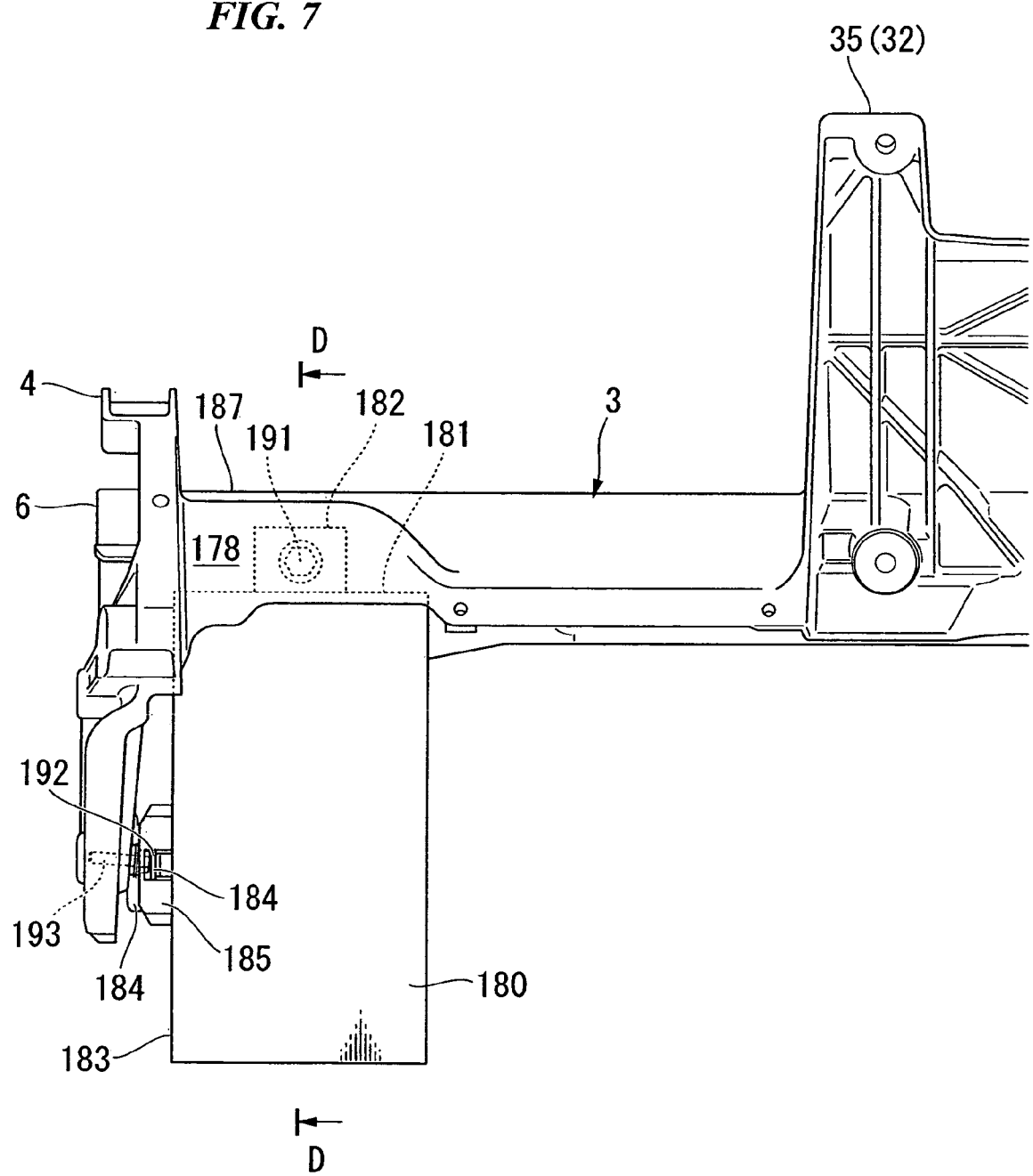
FIG. 7 is a view from the downside showing the left mounting portion in FIG. 1.

As shown in FIGS. 6 and 7, the fuse box 180 is configured as a rectangular resin component having therein a fuse (not shown), and is mounted toward a direction opposite to the extending direction of the steering support portion 32, that is, it is mounted toward the forward and slightly inclined downward direction of the vehicle.

Figure 8:
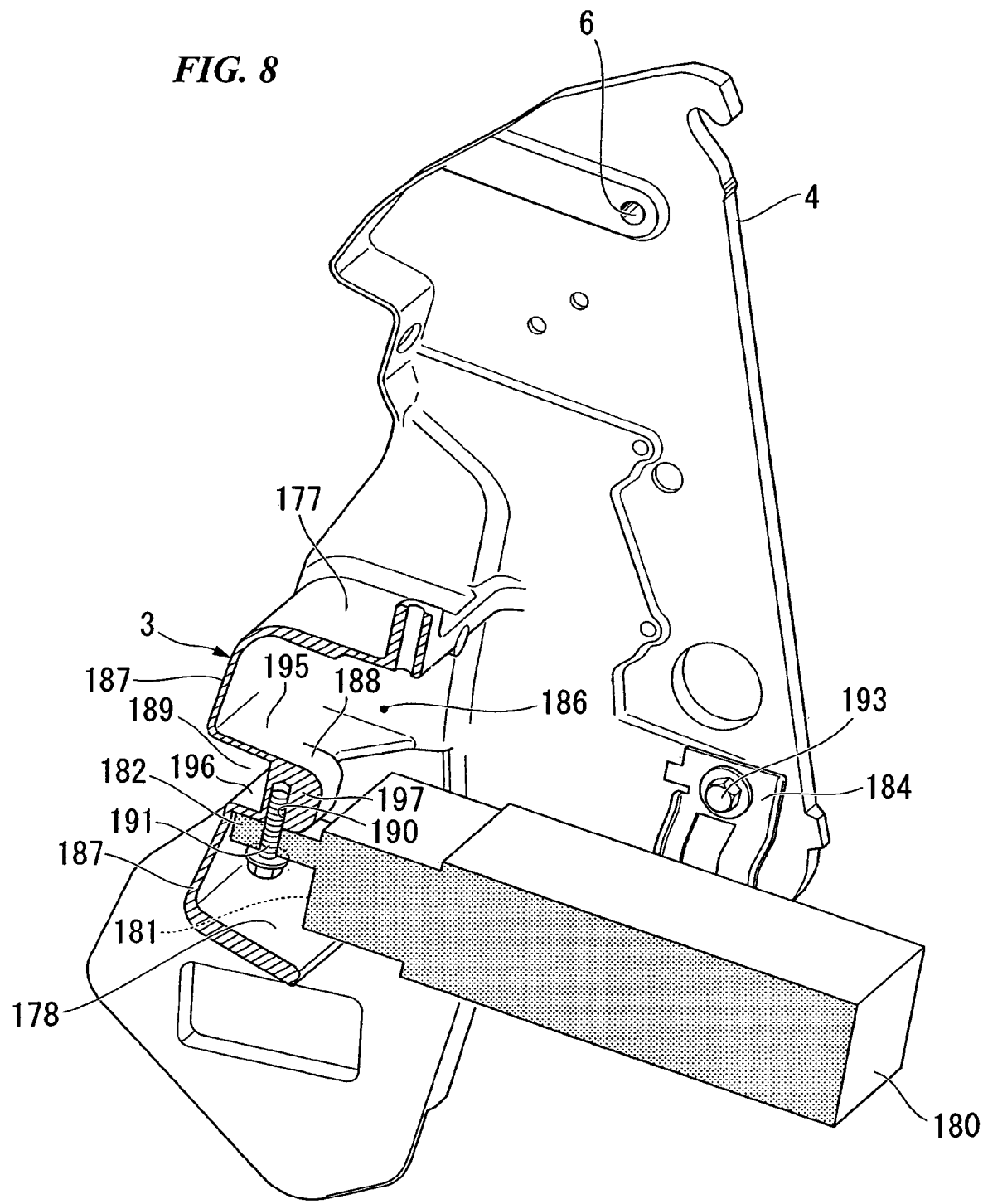
FIG. 8 is a perspective sectional view along the line D-D in FIG. 7.
Figure 9:
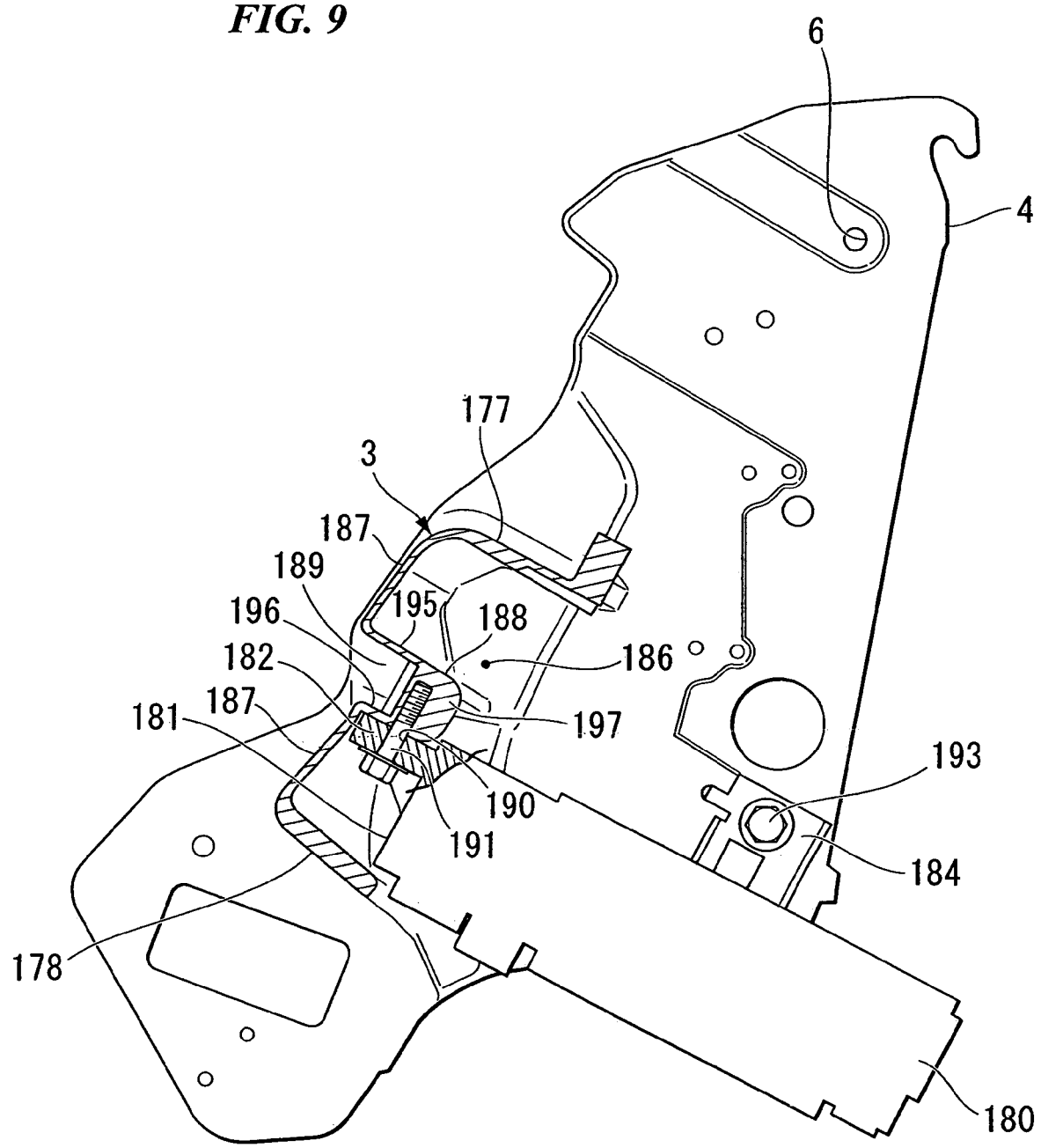
FIG. 9 is a sectional view along the line D-D in FIG. 7.

A mounting bracket 182 is provided at the center of the upper portion of an end surface 181 close to the long side of the fuse box 180 in a width direction (see FIGS. 8 and 9). A lock portion 185 is provided on a left surface 183 of the fuse box 180 so as to be fitted to a metal arm bracket 184 mounted to the left mounting portion 4.

As shown in FIGS. 8 and 9, the main member 3 integrally formed with the left mounting portion 4 includes an opened portion 186 of which one side (front side) is opened, and is formed into a U-shape in a sectional view by an upper wall 177, a lower wall 178, and a bottom wall 187. A protruding portion 188 is formed in the bottom wall 187 opposed to the opened portion 186 of the main member 3 so as to protrude toward the opened portion 186. In the inner side (rear side) of the protruding portion 188, a concave portion 189 is formed in the lower surface of the bottom wall 187 so as to be opened toward a direction opposite to the protruding direction of the protruding portion 188. In the front end portion of the protruding portion 188, a mounting portion 197 is formed between a lower wall 196 and an upper wall 195 of the concave portion 189. A mounting hole 190 is formed in the mounting portion 197 from the lower wall 196 to the upper wall 195 of the protruding portion 188.

The upper surface of the mounting bracket 182 of the fuse box 180 overlaps with the lower wall 196 of the protruding portion 188 from the downside, the front end surface of the mounting bracket 182 is located at a position in the vicinity of the bottom wall 187 of the main member 3, and then a bolt 191 screw-connected to the mounting bracket 182 of the fuse box 180 from the downside is inserted into the mounting hole 190, thereby mounting the mounting bracket 182 of the end surface 181 of the fuse box 180 to the main member 3.

On the other hand, the main member 3 integrally formed with the left mounting portion 4 is connected to the upper end portion of the metal arm bracket 184 by a bolt 193. An arm bracket 192 is bent from the lower portion of the upper end portion toward a vehicle interior in a crank shape to thereby form a member having an extended lower end portion with a gap between the left mounting portion 4 and the arm bracket 192 so that the lower end portion is fitted and locked to a slit 192 of the lock portion 185 provided on the side surface 183 of the fuse box 180.

According to the above-described embodiment, the protruding portion 188 protruding toward the opened portion 186 is provided in the bottom wall 187 of the main member 3 having the opened portion 186 formed into a U-shape in a sectional view, and the bolt 191 inserted into the mounting bracket 182 of the end surface 181 of the fuse box 180 is fastened in the mounting hole 190 of the front-end mounting portion 197 of the protruding portion 188. Therefore, unlike the related art in which a storage portion is formed by being surrounded by wall portions, it is not necessary to reduce the area of the section of the steering hanger beam 1 in order to ensure space for the storage portion. Accordingly, it is possible for store the fuse box 180 to be within the U-shaped section while keeping the U-shaped section of the main member 3. As a result, it is possible to facilitate the arrangement of the fuse box 180 with a simple structure without deteriorating the strength and rigidity thereof.

It is advantageous in that the mounting bracket 182 of the fuse box 180 is protected within the U-shaped section of the main member 3.

Then, the concave portion 189 is provided in the inside of the protruding portion 188 so as to be opened in a direction opposite to the protruding direction of the protruding portion 188. Therefore, it is possible to keep the thickness of the upper wall 195 and the lower wall 196 of the protruding portion 188 to be the same as those of the peripheral portions, such as the upper wall 177, the lower wall 178, and the bottom wall 187 of the main member 3. Accordingly, it is possible to improve the strength of the portion having the concave portion 189 by preventing casting defects, such as a cavity formed in the protruding portion 188, and thus to further realize a decrease in weight.

The main member 3 is mounted with the upper end portion of the arm bracket 184 by the bolt 193. The arm bracket 184 is bent from the lower portion of the upper end portion toward the vehicle interior in a crank shape to thereby form a member having an extended lower end portion with a gap between the left mounting portion 4 and the arm bracket 184 so that the lower end portion is fitted and locked to the slit 192 of the lock portion 185 provided on the side surface 183 of the fuse box 180. Therefore, even when a load is input from the left mounting portion 4 at the time of the side collision of the vehicle, a gap between the left mounting portion 4 and the arm bracket 184 is ensured by the crank-shaped arm bracket 184. Also, even when the left mounting portion 4 moves, since the arm bracket 184 is deformed into a plane shape, it is possible to absorb the shock. Accordingly, it is advantageous in that the load does not directly act on the fuse box 180.

Additionally, the invention is not limited to the above-described embodiment. For example, the equipment is not limited to the fuse box, but may be applied to an air-conditioner control box or the like.

Figure 10:
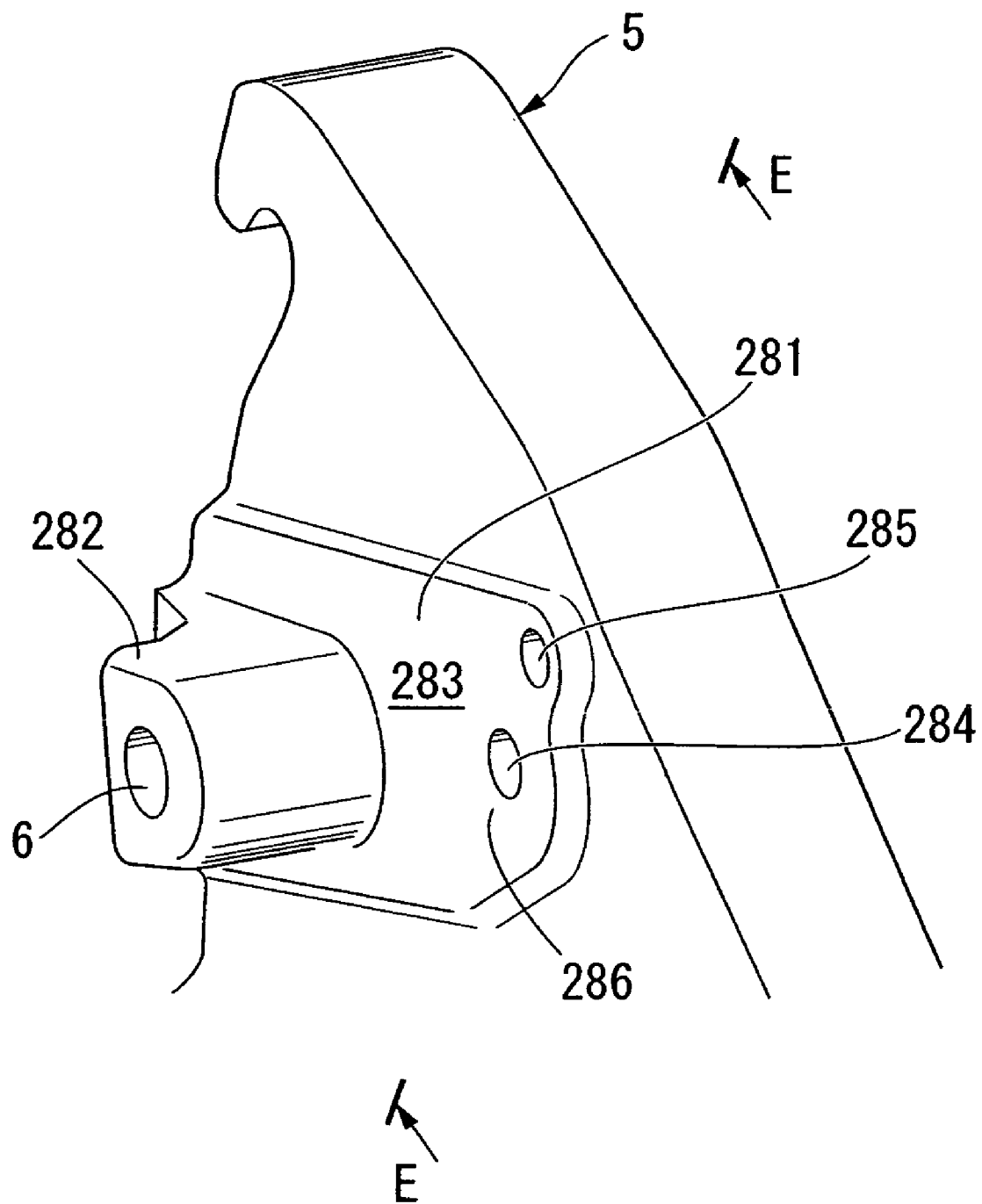
FIG. 10 is an enlarged perspective view showing the upper portion of a right mounting portion in FIG. 1.
Figure 11:
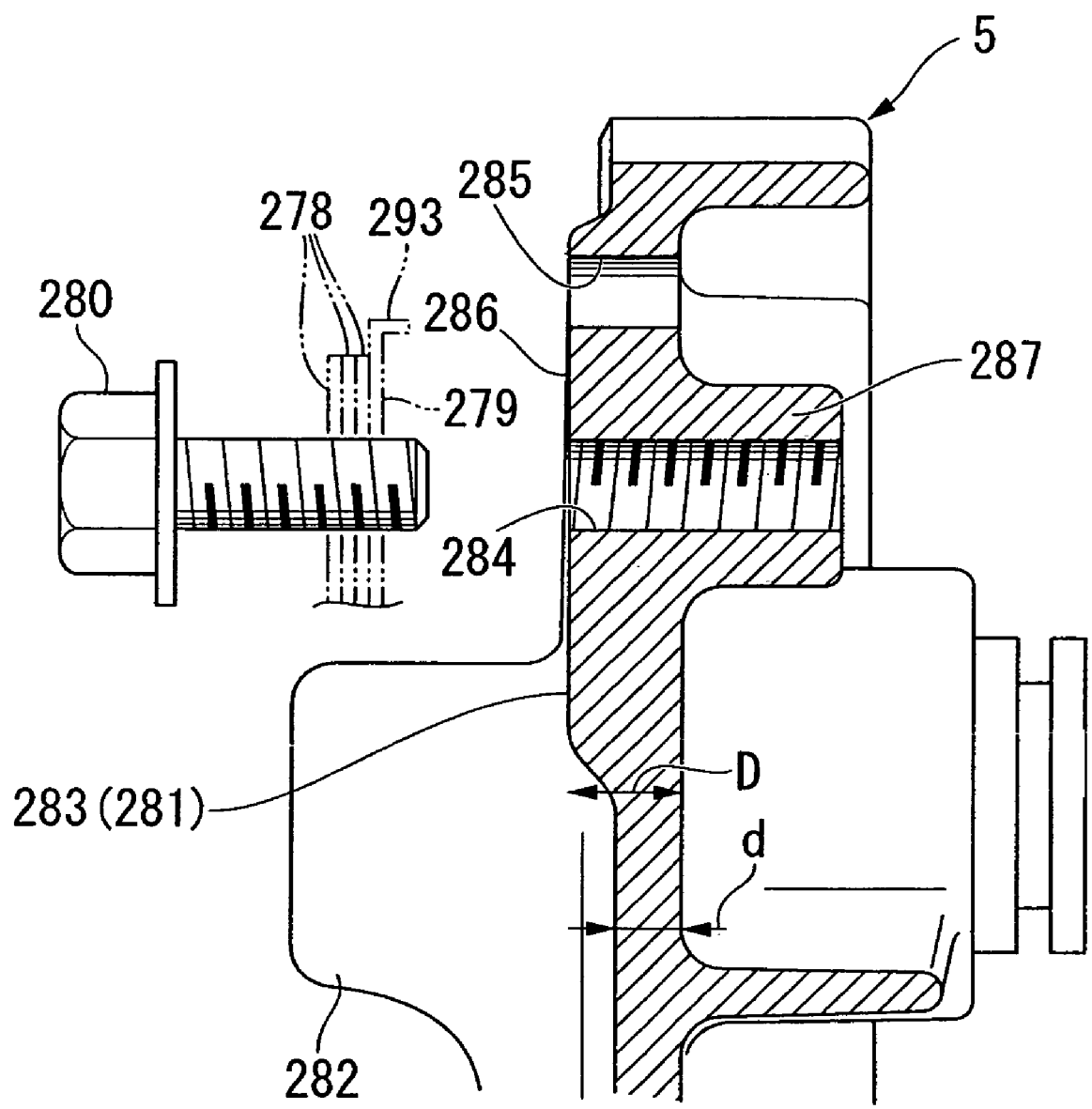
FIG. 11 is a sectional view along the line E-E in FIG. 10.
Figure 12:
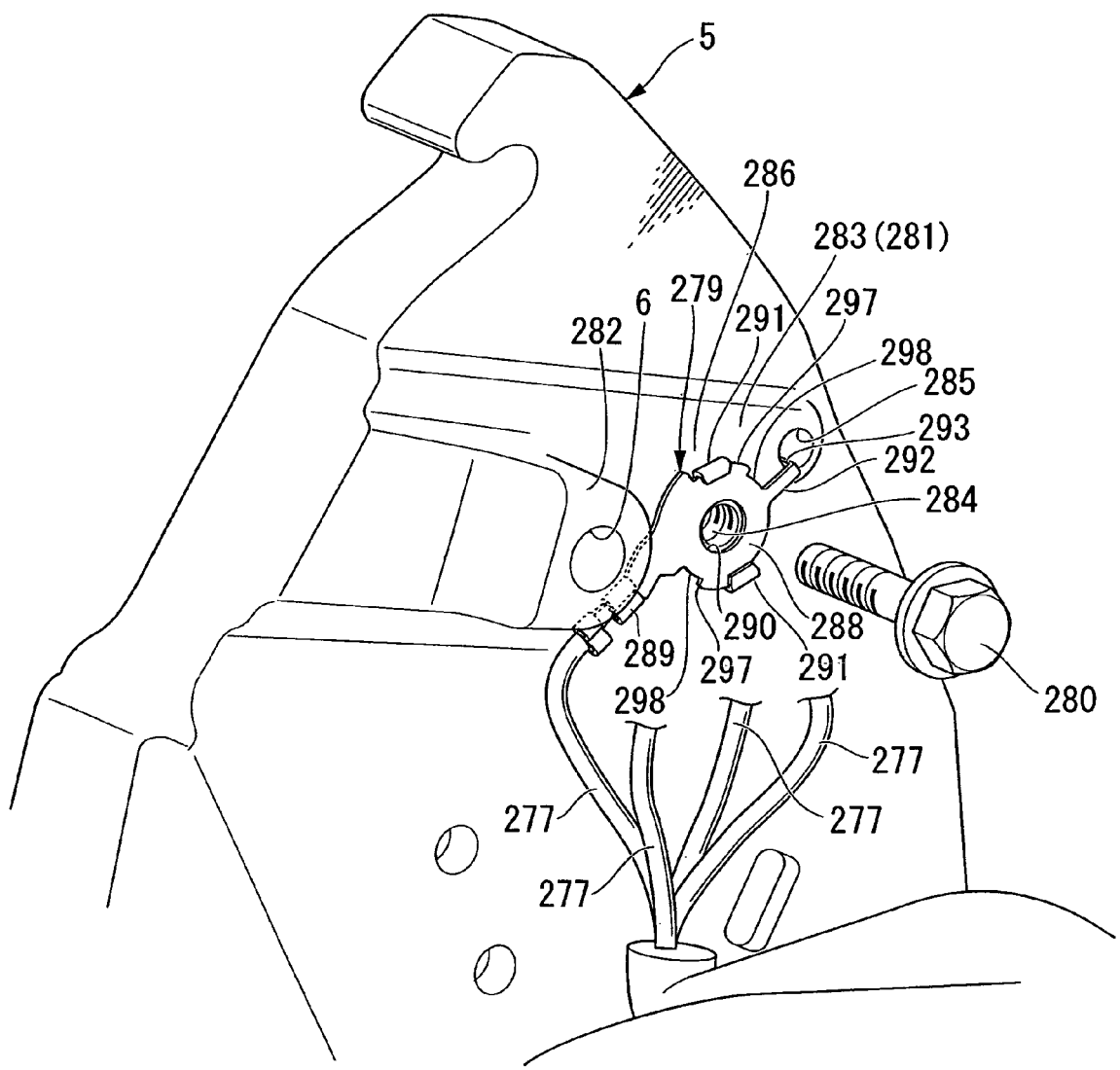
FIG. 12 is a perspective view from the obliquely front side showing a mounted state of a first ground terminal in FIG. 10.

Next, as shown in FIGS. 10 to 12, a first minus ground terminal 279 and second minus ground terminals 278, 278, and 278 of a plurality of harnesses 277 may be mounted to one position in the vicinity of the vehicle-body hole 6 of the right mounting portion 5 by a bolt 280.

As shown in FIG. 10, a thick portion 281 having a more swollen surface than the peripheral portion is formed in the inner surface in the vicinity of the upper end portion of the right mounting portion 5 in a longitudinal direction. A higher protruding portion 282 is formed in front of the thick portion 281, and the vehicle-body mounting hole 6 is formed in the protruding portion 282 so as to be mounted to the right front pillar P. The rear portion of the thick portion 281 is formed into a ground installation portion 283, and a fastening hole 284 of the bolt 280 and a lock hole 285 of the first ground terminal 279 are formed therein.

As shown in FIG. 11, a thickness dimension D of the thick portion 281 is set to be larger than a thickness dimension d of the peripheral portion. In the outer surface of the thick portion 281, a boss portion 287 of the fastening hole 284 protrudes toward the outside of the right mounting portion 5 to thereby ensure a fastening allowance. In the inner surface of the thick portion 281, that is, the peripheral portion of the fastening hole 284 of the bolt 280 and the portion including the lock hole 285 of the first ground terminal 279, a flat cut surface 286 is provided of which a casting surface is scraped and exposed by the cutting. The first ground terminal 279 and the second ground terminals 278, 278, and 278 are connected to the cut surface 286 so as to overlap with each other. In order to ensure the cutting allowance of the cut surface 286, the thickness dimension D of the thick portion 281 is set to be larger than the thickness dimension d of the peripheral portion. Additionally, a tape is attached to the cut surface 286 for a protection until just before the connection of the first ground terminal 279 and the second ground terminals 278.

As shown in FIG. 12, the first ground terminal 279 coming into contact with the cut surface 286 is a general member having a caulking portion 289 provided on one side 20 of a circular-ground portion 288. An insertion-through hole 290 for the bolt 280 is formed at the center of the ground portion 288, and claws 291 and 291 are uprightly formed at two positions in the periphery of the ground portion 288 so as to be curved inward, the claws 291 each having a sandwiching portion between the ground portion 288 and the claw 291. An extending piece 292 is formed outward at the opposite side 25 of the caulking portion 289 of the ground portion 288, and a hook 293 is formed downward at the end portion of the extending piece 292 so as to be inserted and locked to the lock hole 285 of the cut surface 286. Additionally, the three second ground terminals 278 are omitted in FIG. 12.

Figure 13:
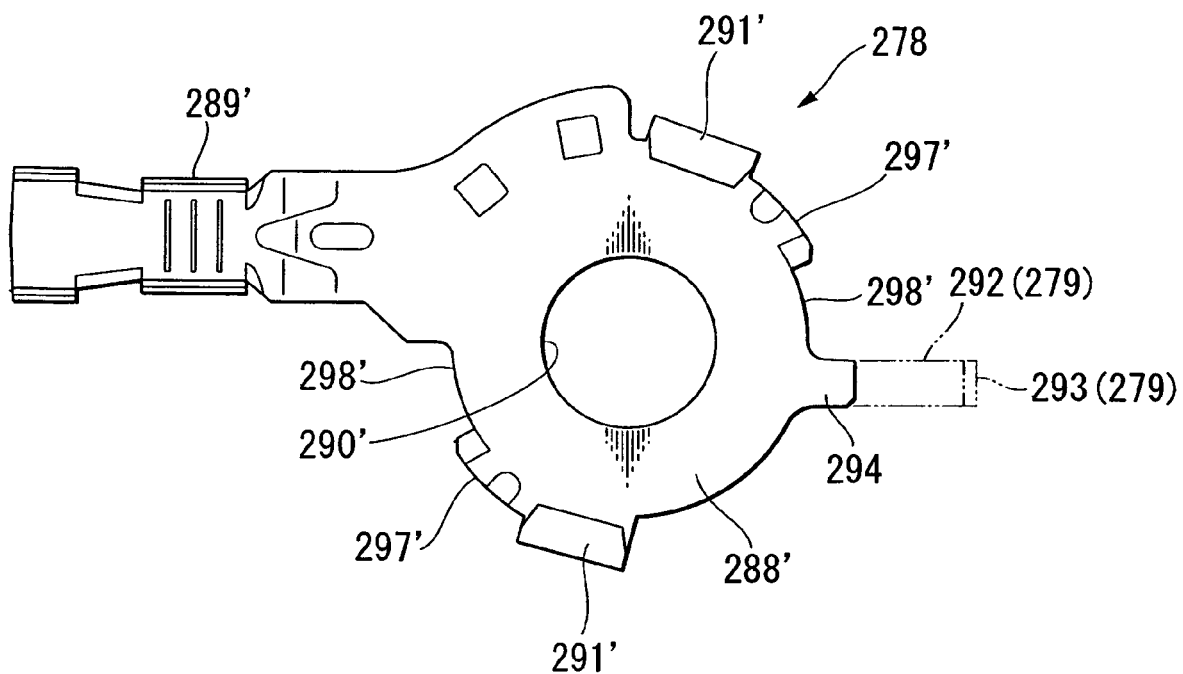
FIG. 13 is a top view showing a second ground terminal.
Figure 14:
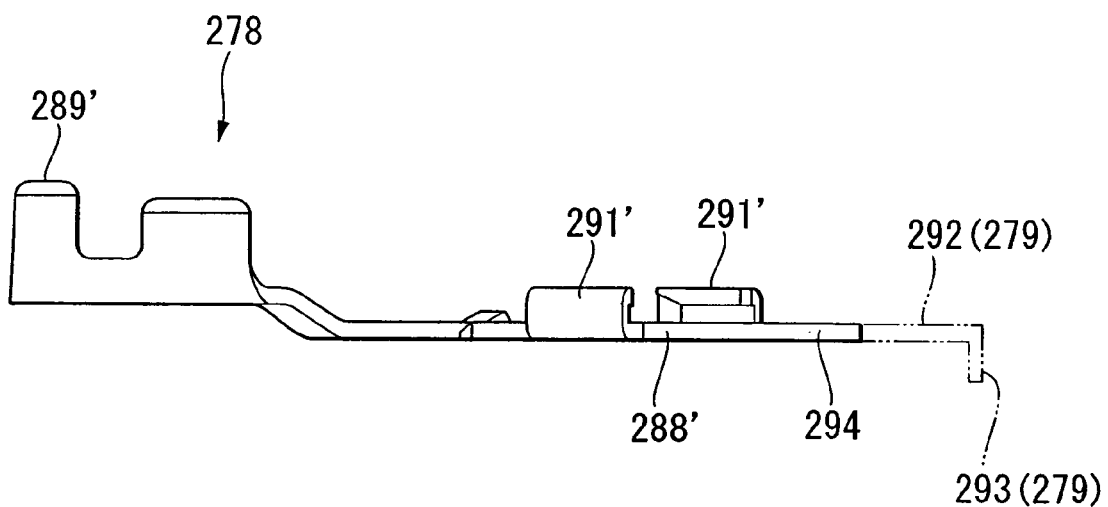
FIG. 14 is a side view showing the second ground terminal.

As shown in FIGS. 13 and 14, the second ground terminal 278 overlapping with the first ground terminal 279 has a caulking portion 289' provided on one side of a circular ground portion 288' in the substantially same manner as the first ground terminal 279. An insertion-through hole 290' for the bolt 280 is formed at the center of the ground portion 288', and claws 291' and 291' are uprightly formed at two positions in the periphery of the ground portion 288'. On the other hand, unlike the extending piece 292 (see the chain lines shown in FIGS. 13 and 14) of the first ground terminal 279, a shortly cut protrusion 294 is formed at the opposite side of the caulking portion 289' of the ground portion 288'.

Here, as shown in FIGS. 12 to 15, a lock edge 297 and a concave portion 298 are continuously formed with the claw 291 of the first ground terminal 1, and a lock edge 297' and a concave portion 298' are continuously formed with each claw 291' of the second ground terminals 278, 278, and 278.

Accordingly, in a state where the first ground terminal 279 is brought into contact with the cut surface 286, the concave portion 298' of the second ground terminal 278 matches with the claw 291 of the first ground terminal 279, and then the second ground terminal 278 is rotated so that the lock edge 297' of the second ground terminal 278 is locked to the claw 291 of the first ground terminal 279. In the same manner, two second ground terminals 278 and 278 are locked to the second ground terminal 278 so as to overlap with each other. Consequently, as shown in FIG. 15, a plurality of (in this embodiment, for example, three) second ground terminals 278 are connected to the first ground terminal 279 located at the downmost position in such a manner that the second ground terminals 278 are sequentially rotated from each other in a circumferential direction.

Figure 15:
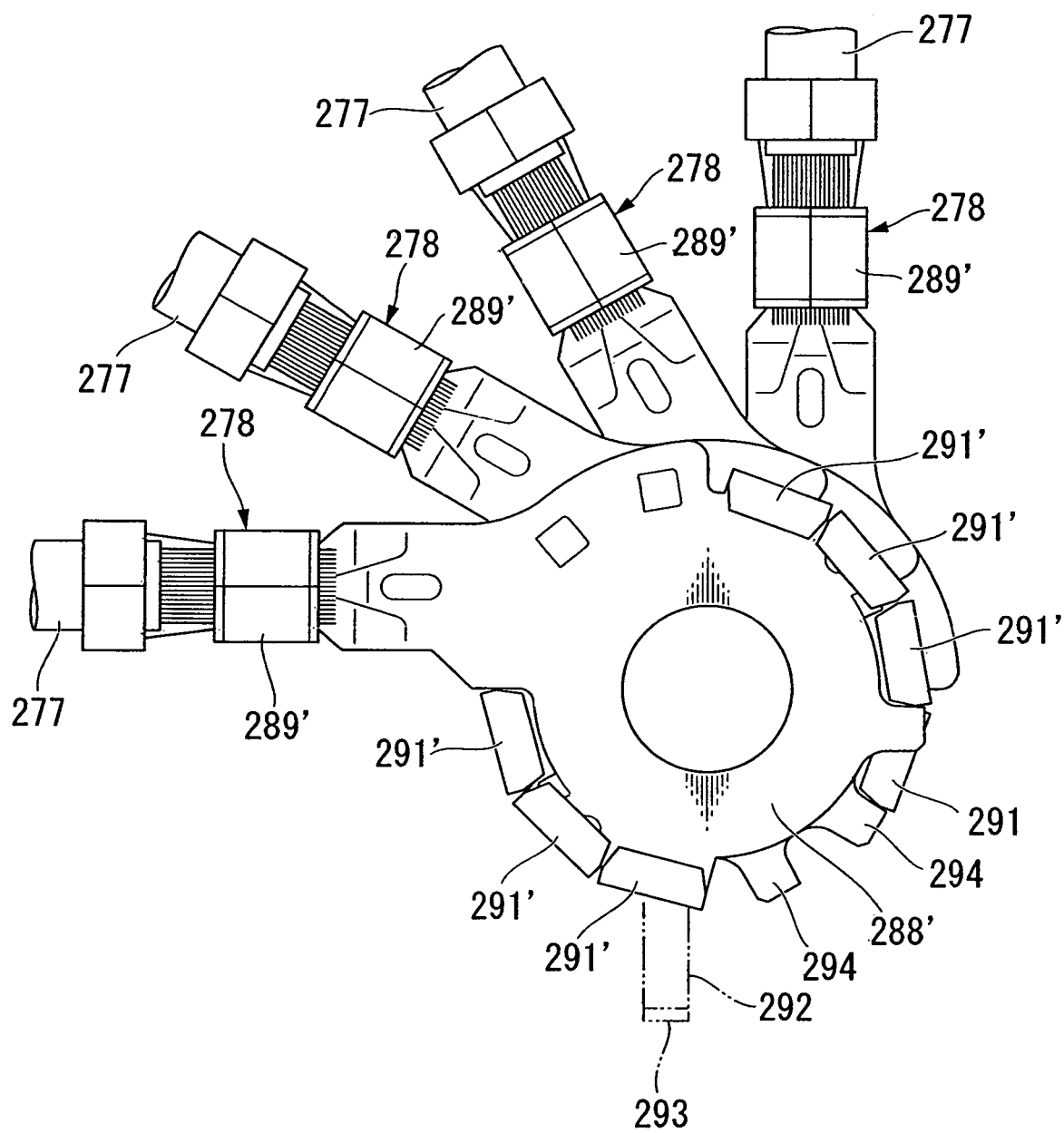
FIG. 15 is a top view showing a state where three second ground terminals put on the first ground terminal.

In such a state shown in FIG. 15, when the bolts 280 inserted into the insertion-through holes 290, 290', 290', and 290' are fastened in the fastening hole 284 of the cut surface 286, it is possible to fasten the first ground terminal 279 and the second ground terminals 278, 278, and 278.

In this case, the hook 293 of the extending piece 292 of the first ground terminal 279 is locked to the lock hole 285. Therefore, the first ground terminal 279 does not rotate together upon fastening the bolt 280. Additionally, the second ground terminals 278 overlapping with the first ground terminal 279 do not rotate due to the claws 291, 291', 291', and 291'. Therefore, the second ground terminals 278 overlapping with the first ground terminal 279 do not rotate together upon fastening the bolt 280.

According to the above-described embodiment, the ground installation portion 283 of the electric component provided in the magnesium-alloy steering hanger beam 1 is provided with the thick portion 281 more swollen than the peripheral portion, and the flat cut surface 286 is formed in the surface of the thick portion 281 so that the magnesium-alloy unprocessed surface is exposed. The first minus ground terminal 279 of the harnesses 277 of the electric components are brought into contact with the cut surface 286, and the second ground terminals 278, 278, and 278 are connected to the first ground terminal 279 so as to overlap with each other. Accordingly, it is more possible to ensure a ground area than a case in which the first ground terminal 279 and the second ground terminals 278 are brought into contact with the casting surface, and thus to improve the ground performance.

The ground installation portion 283 is formed into the thick portion 281 more swollen than the peripheral portion. Therefore, even when the ground installation portion 283 is cut to thereby form the cut surface 286, it is possible to ensure the thickness of the steering hanger beam 1 and to ensure the strength and rigidity of the steering hanger beam 1.

Particularly, in this embodiment, since the ground installation portion 283 is set in the thick portion 281 having the protruding portion 282 of the right mounting portion 5 to be mounted to the right front pillar P, it is possible to improve the ground performance as much as the large volume of the protruding portion 282.

Additionally, the invention is not limited to the above-described embodiment in which the ground installation portion 283 of the right mounting portion 5 is explained, but may be applied to a case in which the ground installation portion is set in the main member 3, the left mounting portion 4, or the left support post portion 54.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A steering hanger beam extending in a width direction of a vehicle and connected to left and right vehicle-body members, the steering hanger beam comprising:

a main member for supporting a steering device;

a pair of front and rear transverse beam portions connected to the main member in the width direction of the vehicle so as to be offset from an axis of the main member to front and rear; and an opening which is formed between the pair of front and rear transverse beam portions so as to penetrate in substantially a vertical direction;

wherein:

a center side end portion of the front transverse beam portion is connected to the main member with a center-front slope portion interposed therebetween, a center side end portion of the rear transverse beam portion is connected to the main member with a center-rear slope portion interposed therebetween, and the center end portions of the front and rear transverse beam portions are integrally connected to the main member in a substantially Y-shape.

2. The steering hanger beam according to claim 1, wherein a center side end of a lateral end portion of the main member is connected to the lateral side end portions of the front and rear transverse beam portions with a lateral-front slope portion and a lateral-rear slope portion interposed therebetween in a substantially Y-shape.

3. The steering hanger beam according to claim 2, further comprising
a central transverse beam portion which is provided in the rear of the main member so as to be parallel to the axis of the main member, wherein
a lateral side end portion of the central transverse beam portion is connected to the center side end portion of the rear transverse beam portion with the rear slope portion making a pair with the center-rear slope portion interposed therebetween, and
the center side end portion of the rear transverse beam portion of the pair of front and rear transverse beam portions is connected to the lateral side end portions of the central transverse beam portion and the main member in a substantially Y-shape.

4. The steering hanger beam according to claim 1, further comprising a passenger-seat airbag device which is disposed in the opening, wherein an airbag support portion for supporting the passenger-seat airbag device is provided in either the main member or the pair of front and rear transverse beam portions.

5. The steering hanger beam according to claim 4, wherein the passenger-seat airbag device is provided on the axis of the main member.

6. The steering hanger beam according to claim 1, further comprising
a steering support portion which extends from the main member to the rear side of the vehicle.

7. The steering hanger beam according to claim 6, further comprising:
a central transverse beam portion which is provided in the rear of the main member so as to be parallel to the axis of the main member; and
a connection arm portion which connects the central transverse beam portion to the rear portion of the steering support portion.

8. The steering hanger beam according to claim 7, further comprising
a support arm portion which connects the main member to the connection arm portion.

9. The steering hanger beam according to claim 1, further comprising:
a central transverse beam portion which is provided in the rear of the main member so as to be parallel to the axis of the main member; and
a support post which connects the central transverse beam portion to a floor panel of the vehicle.

10. The steering hanger beam according to claim 1, further comprising
a mounting portion which is provided in the end in a width direction of the vehicle so as to be connected to the left and right vehicle-body members, wherein
an equipment support portion is provided on the mounting portion for supporting equipment.

11. The steering hanger beam according to claim 10, wherein the main member, the pair of front and rear transverse beam portions, and the mounting portion are integrally formed of light-metal materials by die-casting.

12. The steering hanger beam according to claim 11, wherein:
a thick portion is provided on the mounting portion so as to be more swollen than a peripheral portion; and
a cut surface being exposed by cutting a surface of the thick portion for connecting a ground terminal of a harness is formed on the thick portion.

13. A steering hanger beam extending in a width direction of a vehicle and connected to left and right vehicle-body members, the steering hanger beam comprising:
a main member which supports a steering device;
a pair of front and rear transverse beam portions connected to the main member in the width direction of the vehicle, said transverse beam portions arranged so as to be offset from an axis of the main member to front and rear, respectively;
wherein:
the steering hanger beam has an opening formed therein between the front and rear transverse beam portions so as to penetrate in substantially a vertical direction;
a sectional shape of the main member is substantially a U-shape having an open portion therein;
a protruding portion is provided on a bottom wall of the main member opposite to the open portion and configured so as to protrude toward the open portion; and
a mounting hole, for mounting equipment, is formed in the protruding portion.

14. The steering hanger beam according to claim 13, wherein
a concave portion is provided in the inside of the protruding portion so as to be opened toward a direction opposite to a protruding direction of the protruding portion.

15. A steering hanger beam extending in a width direction of a vehicle and connected to left and right vehicle-body members, the steering hanger beam comprising:
a one-piece main member which supports a steering device;
a pair of front and rear transverse beam portions which are integrally connected to the main member in the width direction of the vehicle, said transverse beam portions arranged so as to be offset from an axis of the main member to front and rear, respectively;
wherein each of the transverse beam portions is formed so as to have a substantially U-shaped cross-section with an opening thereof facing substantially downwardly; and
wherein the steering hanger beam has an opening formed therein between the front and rear transverse beam portions so as to penetrate in substantially a vertical direction.

* * * * *